No. 848,775. PATENTED APR. 2, 1907.
W. SELAKOSKY.
AIR COMPRESSOR.
APPLICATION FILED AUG. 6, 1906.
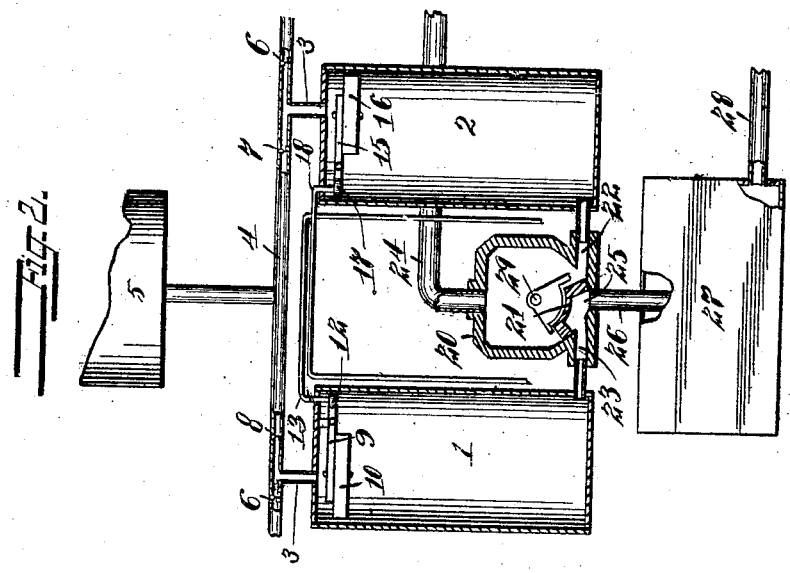
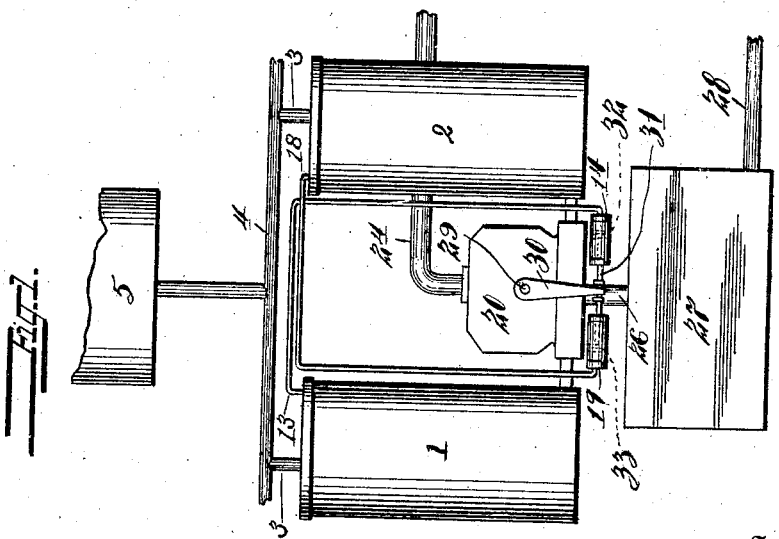
Witnesses
Inventor
Wilson Selakosky
by
Attorneys

UNITED STATES PATENT OFFICE.

WILSON SELAKOSKY, OF WHITE HAVEN, PENNSYLVANIA.

AIR-COMPRESSOR.

No. 848,775.  Specification of Letters Patent.  Patented April 2, 1907.

Application filed August 6, 1906. Serial No. 329,427.

*To all whom it may concern:*

Be it known that I, WILSON SELAKOSKY, a citizen of the United States, residing at White Haven, in the county of Luzerne and State of Pennsylvania, have invented certain new and useful Improvements in Air-Compressors; and I do declare the following to be a full, clear, and exact description of the invention, such as will enable others skilled in the art to which it appertains to make and use the same.

This invention relates to improvements in air-compressors.

The object of the invention is to provide a device of this character by means of which the rise and fall of water in suitably-constructed tanks is employed for compressing air into a reservoir or tank, means being provided whereby the operating mechanism of the device may be automatically controlled.

With the above and other objects in view the invention consists of certain novel features of construction, combination, and arrangement of parts, as will be hereinafter described and claimed.

In the accompanying drawings, Figure 1 is a side view of an air-compressor constructed in accordance with the invention, and Fig. 2 is a vertical sectional view of the same.

Referring more particularly to the drawings, 1 and 2 denote water-tanks, said tanks being closed at their upper ends and connected by short pipes 3 with an air-conducting pipe 4, said pipe being open at its outer ends and connected midway between its ends with a compressed-air tank 5. In the pipe 4 between the outer ends thereof and the connection of the pipes 3 therewith are arranged inlet air-valves 6. In the pipe 4 between the pipe 3 of the tank 2 and the discharge-pipe to the compressed air-tank is arranged a check-valve 7, and in the pipe 4 between the pipe 3 of the tank 2 and the discharge-pipe of the compressed-air valve 5 is arranged a check-valve 8.

In the tank 1 adjacent to its upper end is pivotally mounted a lever 9, with one end of which is connected a float 10. On the opposite end of the lever is arranged a valve-plate 12, adapted to be engaged with the open end of an air-discharge pipe 13, which enters the upper end of the tank 1, as shown. The opposite end of the pipe 13 is connected with a small air-cylinder 14, the object of which will be hereinafter described.

In the tank 2 adjacent to the upper end of the same is pivotally mounted a lever 15, to one end of which is connected a float 16 and on the opposite end of which is arranged a valve-plate 17. The valve-plate 17 is adapted to open and close the end of an air-discharge pipe 18, the upper end of which projects into the upper end of the tank 2, as shown. The opposite end of the pipe 18 is connected with a small air-cylinder 19, the purpose of which will be hereinafter described.

Arranged between the tanks 1 and 2 is the casing 20 of a controlling-valve 21. The valve-casing 20 is provided at its lower end with oppositely-opening discharge-ports 22 and 23. The port 22 is connected by a short pipe with the lower end of the tank 2, while the port 23 is connected by a short pipe to the lower end of the tank 1. Connected with the upper end of the casing is a water-supply pipe 24, said pipe being connected with a pump or other source of water-supply by means of which water is conducted to the casing 20. In the lower end of the casing 20, midway between the ports 22 and 23, is arranged a discharge-port 25, which is connected by a pipe 26 to a water-tank 27. The tank 27 is provided with a discharge-pipe 28, as shown.

The valve 21 in the casing 20 is mounted upon a shaft 29, which projects through suitable bearings in the side of the casing and is adapted to be oscillated to move the valve back and forth across the discharge-ports 22 and 23 to alternately connect the tanks 1 and 2 with the valve-casing and to alternately connect said ports with the discharge-port 25, as shown. On one of the projecting ends of the shaft 29 is secured a depending lever 30, the lower end of which is adapted to be loosely engaged with a piston-rod 31. The opposite ends of the piston-rod 31 are connected to pistons 32 and 33, which are respectively adapted to work in the cylinders 14 and 19.

In operation, assuming that the parts are in the position shown in the drawings, water from the pump or other supply is forced through the pipe 24 and into the valve-casing 20. From thence it passes through the port 22 therein and into the tank 2. As the water rises in the tank 2 the air in the tank will be forced out through the pipe 3 in the upper ends thereof and through the check-valve 7 into the pipe 4, the inlet-valve being held closed by the pressure of said air. The air after passing through the check-valve 7 passes through the pipe 4 to the compressed-air tank 5. When the water in the tank 2 has risen to the float 16, said float will be raised, thereby disengaging the valve-plate 17 from the end of the pipe 18, which will permit some of the air from the tank 2 to pass through the pipe 18 to the cylinder 19, where said air will act upon the piston 33 to shift the piston-rod 31, thus swinging the lever 30 and causing the same to oscillate the shaft 29 and to move the valve 21 over the port 22, thereby cutting off the passage of water from the casing 20 to the tank 2 and permitting the water in said tank to discharge through the ports 22 and 25 into the pipe 26 and from thence to the discharge-tank 27.

The valve 21 in moving over the port 22 will uncover the port 23, thus permitting the water in the casing 20 to enter the tank 1, wherein the operation described in connection with the tank 2 will be repeated, thereby forcing the air in the tank 1 into the compressed-air tank, as will be understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. In an air-compressor, the combination with two tanks, of an air-supply pipe connected thereto, inlet and discharge valves arranged in said supply-pipe, a compressed-air tank connected to said air-supply pipe between said discharge-valves, a valve-casing arranged between said tanks, a water-supply tank connected to said casing, side discharge-ports connecting the lower end of the casing with the lower end of said tanks, a main discharge-port arranged in said casing between said side discharge-ports, a valve mounted in said casing and adapted to alternately cover and uncover the side ports in said casing to connect the latter with first one and then the other of said tanks and to alternately connect said tanks with a main discharge-port arranged in said casing, an operating-lever connected to the stem of said valve, and means actuated by the pressure of air in said tanks to automatically operate said lever and thereby turn said valve first in one direction and then in the other, substantially as described.

2. In an air-compressor, the combination with a pair of tanks, of an air-inlet pipe connected thereto, air inlet and discharge valves arranged in said pipe, an air-discharge pipe connected to said inlet-pipe between said discharge-valves, a valve-casing arranged between said tanks, a water-supply pipe connected to said casing, water-discharge ports arranged in each side thereof and connected to the lower ends of said tanks, a main discharge-port arranged between said side ports, an oscillatory valve-shaft arranged in said casing, a valve mounted on said shaft, said valve being adapted to alternately connect first one and then the other of said tanks with said casing to supply water to the same and to alternately connect said tanks to the main discharge-port to drain the water from the same, an operating-lever connected to the shaft of said valve, a pair of air-cylinders, pistons arranged in said cylinders, a piston-rod common to both of said pistons and loosely connected to said valve-lever, and means whereby said pistons are automatically operated, substantially as described.

3. In an air-compressor, the combination with a pair of tanks, of an air-inlet pipe connected thereto, air inlet and discharge valves arranged in said pipe, an air-discharge pipe connected to said inlet-pipe between said discharge-valves, a valve-casing arranged between said tanks, a water-supply pipe connected to said casing, water-discharge ports arranged in each side thereof and connected to the lower ends of said tanks, a main discharge-port arranged between said side ports, an oscillatory valve, a valve-shaft arranged in said casing, a valve mounted on said shaft, said valve being adapted to alternately connect first one and then the other of said tanks with said casing to supply water to the same and to alternately connect said tanks to the main discharge-port to drain the water from the same, an operating-lever connected to the stem of said valve, a pair of air-cylinders, pistons arranged in said cylinders, a piston-rod common to both of said pistons and loosely connected to said valve-lever, air-conducting pipes connected to the upper ends of said tanks and to said cylinders, whereby a charge of air from said tanks will operate the pistons of said cylinders to automatically shift said valve, floats arranged in the upper ends of said tanks, valves operated by said floats to open and close the ends of said air-supply pipes when the water rises and falls in said tanks, substantially as described.

In testimony whereof I have hereunto set my hand in presence of two subscribing witnesses.

WILSON SELAKOSKY.

Witnesses:
JOHN A. KECK,
FRANCIS DEAL.